Jan. 27, 1925.   1,524,434
F. V. HEINEMANN ET AL
AUTOMOBILE HOOD COVER AND BOOT
Filed Jan. 25, 1922
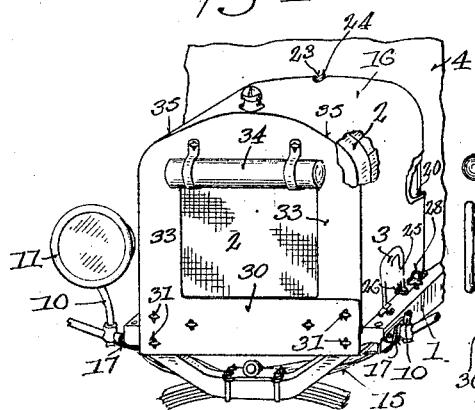
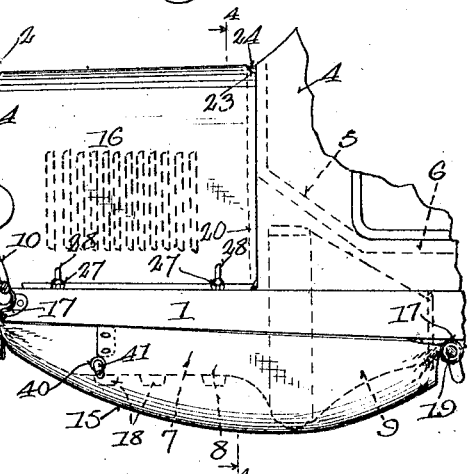
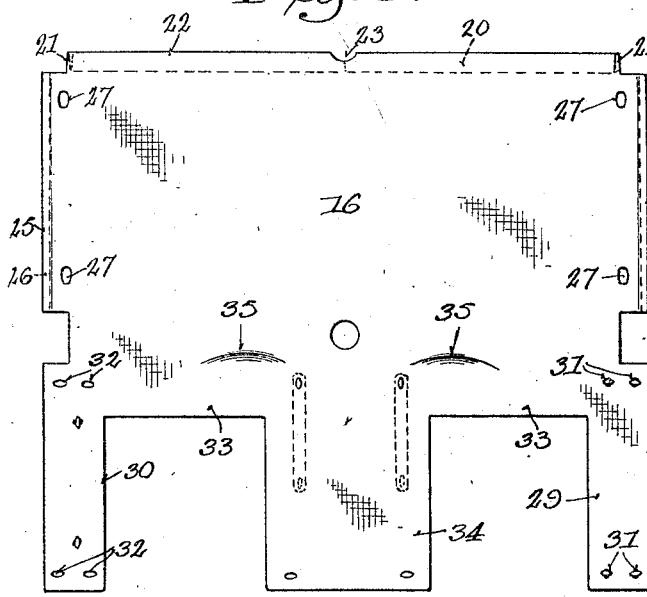
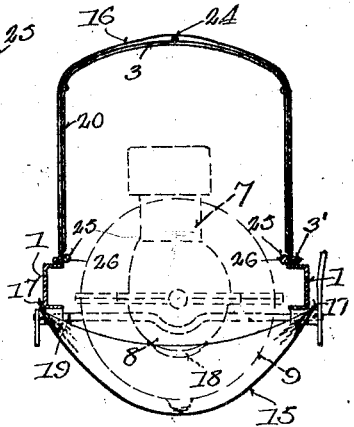
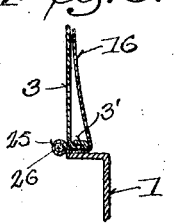
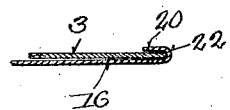
Fred V. Heinemann
David Seekins
INVENTORS
BY
Erwin, Wheeler & Woolard
ATTORNEYS.

Patented Jan. 27, 1925.

1,524,434

UNITED STATES PATENT OFFICE.

FRED V. HEINEMANN AND DAVID SEEKINS, OF APPLETON, WISCONSIN.

AUTOMOBILE HOOD COVER AND BOOT.

Application filed January 25, 1922. Serial No. 531,540.

*To all whom it may concern:*

Be it known that FRED V. HEINEMANN and DAVID SEEKINS, citizens of the United States, residing at Appleton, county of Outagamie, and State of Wisconsin, have invented new and useful Improvements in Automobile Hood Covers and Boots, of which the following is a specification.

This invention relates to automobile hood covers and boots.

It is an object of this invention to provide means for confining within the hood of a motor vehicle the air admitted thereto through the radiator and heated thereby, and for directing said air about the underside of the engine for the purpose of warming the oil pockets which ordinarily exist in the engine crank case, and thence directing said air upwardly against the floor boards of the driver's compartment of the vehicle, thus using to the fullest possible extent the heat developed by the motor.

It is also an object of this invention to provide a novel and particularly effective hood cover having means at its rear and side margins adapted for positive engagement with the hood.

Further objects of this invention are to provide a hood cover and boot combination in which the hood cover and boot may be separately manipulated to facilitate access to the operative portions of the driving motor; to provide a hood cover particularly adapted for rapid manipulation; to exclude from the carburetor road dust stirred up by the wheels, and to provide simple and effective means for accomplishing the objects specified herein, which may be cheaply and readily constructed.

In the drawings:—

Figure 1 is a perspective view of part of the front of an automobile showing our improved hood cover applied thereto, portions of the cover being broken away to expose more clearly its construction.

Figure 2 is a side elevation of the same part of an automobile, the fenders and wheels being removed to expose the manner in which the boot is applied.

Figure 3 is a plan view of the improved hood cover, the use of which is contemplated in connection with this invention as it appears when spread out upon a plane surface.

Figure 4 is a section taken on line 4—4 of Figure 2.

Figure 5 is a detail of the manner in which the side margins of the hood cover are engaged by the hood.

Figure 6 is a detail illustrating the manner in which the end margins of the hood cover are engaged by the hood.

Like parts are identified by the same reference characters throughout the several views.

It will be understood that hood covers embodying this invention may be designed for use upon any type of motor vehicle. The vehicle here shown includes a frame member 1, radiator 2, hood 3, body 4, floor boards 5 and 6, motor 7, crank case 8, gear housing 9, lamp brackets 10 and lamps 11. It will be understood that it is the usual practice to provide the hood 3 with louvres or openings, not shown in the drawings herein, which are provided for the purpose of allowing the free escape from the hood of the air admitted to the interior thereof through the radiator where such air is used for cooling purposes. A fan is ordinarily provided immediately behind the radiator for the purpose of drawing air therethrough, and in the ordinary use of a vehicle in warm weather it is important to permit such air to have a ready escape and thereby facilitate the speedy replacement of cooling air which has been heated by the radiator.

In cool weather, however, it is desirable to conserve as much of this heat as possible, and to this end automobile hoods have frequently been provided with covers which partially close the louvres therein. Under such circumstances the air drawn into the hood through radiator 6 by the fan will be ejected in part beneath the car, but a large part of it will be forced rearwardly along the hood beneath the cover causing the cover to vibrate or flap. Also the air escaping beneath the car has not been used for any purpose, and it has not hitherto been possible to utilize the heat carried by such air. For the purpose of remedying these difficulties, we have provided a boot 15 secured at its forward and rear ends to the frame of the vehicle and adapted to confine and direct the air heated by the radiator and the engine for the purpose of utilizing the heat thereof. We have also provided more effective means than have hitherto been available for confining the rear and side margins of the hood cover 16 to prevent the escape of air between said cover and the hood and, incidentally, to abolish annoying and detrimental flapping which has hitherto been occasioned by the escape of such air.

The boot 15 may be attached to and supported from the vehicle in any desired or suitable manner. It may be provided at its corners with straps 17, by means of which it may be fastened to any convenient point. For example, the straps at the forward end of the boot are here illustrated as being attached to the brackets 10 of lamp 11 and the straps at the rear end of the boot are passed about a cross member 19 of the frame. It has been found necessary in actual practice to provide openings 40 closed by buttons at various points in the boot for the purpose of allowing such elements as the steering connections 41, exhaust pipe, drive shaft, oil gauge, etc., to be introduced through the boot in an easily understood manner. The location and nature of such slots are problems peculiar to each type of vehicle and any person skilled in the art may readily adapt to any particular vehicle a boot embodying this invention. It is only important that the boot present a substantially unbroken surface from one end to the other. It will be obvious that after the boot is fitted snugly about each member or element, for which a hole or slot is provided therein, there will be little escape of air adjacent such elements. The majority of the air introduced into the hood through the radiator and heated thereby will pass downwardly about the crank case, and thence rearwardly and upwardly against the floor boards 5 and 6 of the vehicle. One advantage of such an arrangement is that the heated air serves to warm the crank case 8 and the oil collecting depressions 18 therein, thus preventing the motor oil from congealing. The boot also directs sufficient air against the floor boards to keep the occupants of the forward compartment of the vehicle comfortably warm. It will also be noted that the gear housing 9 as well as the motor is enclosed. The heat thus transmitted tends to soften the grease and oil, which would otherwise become congealed in all portions of the mechanism, and thus greatly reduces the excessive friction usually encountered in winter driving. The arrangement of the boot 15 is preferably such that the air can escape with comparative freedom at the rear end of the boot, thus facilitating the passage of air in considerable quantities through the comparatively tortuous passage provided therefor.

It will be understood, of course, that suitable fastening devices, such as straps, may be provided at intervals along the sides of the boot if necessary. It has been found, however, that when the straps 17 are properly tensioned and the boot has been shaped to conform to the configuration of the under surface of the motor and the related parts of any particular vehicle, the side margins of the boot will ordinarily fit snugly against the frame thereby preventing the undue escape of warm air along such margins.

A boot thus tightly fitted between the frame members of the vehicle and extending from the radiator rearwardly, at least as far as the driver's compartment, has an added and important function promoting the smooth running of the vehicle. In certain makes of cars the construction is such that the dust stirred up by the road wheels can find its way upwardly between the frame members to the carburetor. Such dust drawn into the carburetor and thence into the motor itself rapidly wears the cylinders and other bearing surfaces of the motor, eventually reaching the crank shaft bearings. When a boot embodying this invention is in use it will serve to exclude very largely all road dust from the carburetor. This is particularly true in view of the fact that the air within the hood is confined therein by the hood cover and boot, and is thus maintained at a pressure slightly above atmospheric pressure. Such air tending to escape from the boot through any openings which may exist therein, prevents the ingress of dust.

Mention has hitherto been made of the fact that the hood cover of ordinary construction does not successfully confine within the hood, the air admitted thereto through the radiator. For the purpose of overcoming this difficulty, and thereby cooperating to the fullest extent with the boot above described, we have devised the type of hood cover shown in drawings.

The hood cover 16 may be made of a single piece of fabric, and is preferably made of heat insulating material in order to conserve to as great an extent as possible the heat developed by the motor. The material 20 adjacent the rear end margin of the hood cover is folded back upon itself to the extent indicated by the dotted line in Figures 2 and 3. The margin 21 of the portion of material thus folded back are stitched to the main portion of the hood cover, thereby forming a pocket 22 into which the rear margin of the hood 3 is adapted to be received at an intermediate point. The material forming the pocket 22 is cut away in the manner shown in the drawings at 23 to leave room for the passage therethrough of the pintle 24, upon which the hood 3 is pivoted, and is thus provided with a continuous pocket into which each side of the hood is adapted to be received. When the hood is clamped in its closed position it will be obvious that every portion of the rear margin of the hood cover will be positively engaged between the hood and the body of the vehicle, and will thereby be secured against the possibility of flapping or of the release of air from within the hood.

Each of the side margins 25 of the hood cover has a rod 26 of metal or other re-enforcing material stitched therein. Adjacent each of said margins 25 are a suitable number of openings 27 through which the hood securing devices 28 may be passed into operative position. As is clearly brought out in the accompanying drawings, the arrangement is such that when the hood is closed the material of the hood cover will be engaged beneath the lower margin 3' of the hood and the re-enforcing rod 26 will abut against the inner side of the hood and will prevent the disengagement of the hood cover therefrom. It must thus be apparent that we have provided means for engaging each side and rear margin of the hood cover throughout its length.

The precise means by which the hood cover is fastened at the front of the vehicle are not material to this invention. It is preferred, however, that the means be such that a minimum of fastenings will be required, in order to permit of the ready attachment and removal of the cover. It is preferred therefore that the hood cover 16 be suitably shaped or shouldered at 35 to conform to the curved portions at the front of the radiator, and that the flaps 29 and 30 be adapted to overlap one another across the lower front portions of the radiator 2. Suitable buttons 31 and eyelets 32 may be provided for the purpose of securing together the flaps 29 and 30. It will be noted that the radiator opening is reduced in area by the overlapped flaps 29 and 30, and by the side marginal portions 33. A central flap 34 may be provided to cover the restricted open area of the radiator in the usual manner when desired.

It will be noted that the attaching means described herein for securing the hood cover to the vehicle render the hood cover instantly applicable or removable. It is unnecessary to provide upon the vehicle any permanent fixtures whatsoever to facilitate the attachment of a hood cover embodying this invention. In fact there are but few attaching devices needed upon the cover itself.

In the use of this invention it will be found that the hood cover can be properly attached only when both sides of the hood have been loosened. Each leaf of the hood can then be slipped separately into the pocket or envelope 22. The leaves of the hood can then be lowered with the rods 26 tucked beneath their lower margins. The clamping members 28 will project through the opening 27 in the hood cover and may thus be manipulated in the usual way to clamp the hood tightly in place and to secure the hood cover at all points of its side and rear margins. When the hood is lowered the hood cover will be drawn tight and the radiator filling cap will project through an opening provided therefor. The shouldered portions 35 of the hood cover will rest upon the rounded upper surface of the radiator, the side flaps 33 will lie along the sides of the radiator opening and the securing flaps 30 and 31 may be overlapped and buttoned across the lower front portion of the radiator. This operation consumes but a few moments.

When it is desired to remove the hood cover altogether or to open either leaf of the hood, it will be found necessary to unbutton the buttons 31. As will readily be seen from the drawings either leaf of the hood will then be left free to be raised, or the hood cover can be removed altogether by loosening both leaves, withdrawing the beaded margins 25 of the hood cover and pulling the envelope or pocket portion 22 of the hood cover rearwardly out of engagement with the rear margins of the leaves.

As has been pointed out above the particular means of attachment of the boot described herein must depend upon the vehicle with which the boot is to be used. It will almost invariably be found possible, however, to support the four corners of the boot by means of straps, whereby the boot may be engaged with the lamp brackets and with some portion of the frame, adjacent the middle of the chassis. If the boot is properly fastened, its side margins may not need to be secured, but it will almost invariably be found necessary to provide slots adapted to be buttoned together to permit the boot to be fitted snugly about the various mechanical elements which it must necessarily intersect.

We claim:

1. The combination with a motor vehicle provided with a hood having a pivoted leaf, of a hood cover provided with a flap adapted to be positioned beneath the rear margin of said leaf.

2. The combination with a motor vehicle having a hood comprising a pair of leaves hinged upon a central pintle, of a hood cover folded at its rear margin forwardly upon itself and cut away at an intermediate point to accommodate said pintle, said forwardly folded portion being engageable beneath the rear margin of the hood.

3. The combination of a motor vehicle provided with a frame and with a hinged hood adapted to close downwardly against said frame, of a hood cover provided with a beaded margin adapted to be engaged and interlocked between the hood and the frame.

4. The combination with a motor vehicle provided with a hinged hood, of a hood cover adapted to fit snugly upon said hood, a re-enforcing rod secured in a margin of said cover and adapted to be engaged behind the lower margin of the closed hood.

5. The combination with a motor vehicle provided with a hood so disposed that its rear and side margins may be brought into contact with the body of the vehicle, of a hood cover adapted to be engaged between the hood and the body of the vehicle by the margins aforesaid.

6. The combination with a motor vehicle provided with a hood adapted to be manipulated to a closed position with its rear and side margins abutted against the body of the vehicle, of a hood cover provided with envelope flaps adapted to be engaged over the rear margins of the hood and with thickened side flaps adapted to be engaged beneath the side margins of the hood.

7. The combination with a motor vehicle provided with a radiator, with a hood adapted to be manipulated to a closed position with its rear and side margins abutting against the body of the vehicle, of a hood cover having pockets in its rear margins engageable about the rear margins of the hood and having thickened flaps at its side margins engageable beneath the side margins of the hood, and means for securing said hood cover across the front of the radiator, thereby preventing it from moving rearwardly to the extent of disengagement from said hood.

FRED V. HEINEMANN.
DAVID SEEKINS.